United States Patent [19]

Hannig

[11] Patent Number: 4,898,269

[45] Date of Patent: Feb. 6, 1990

[54] CLAMPING DEVICE FOR PALLETS

[75] Inventor: Helmut Hannig, Rainau-Buch, Fed. Rep. of Germany

[73] Assignee: Alfing Kessler Sondermaschinen GmbH, Fed. Rep. of Germany

[21] Appl. No.: 253,877

[22] Filed: Oct. 5, 1988

Related U.S. Application Data

[63] Continuation of Ser. No. 65,851, Jun. 24, 1987, abandoned.

[30] Foreign Application Priority Data

Jun. 27, 1986 [DE] Fed. Rep. of Germany ....... 3621604

[51] Int. Cl.[4] ............................................. B65G 47/00
[52] U.S. Cl. .................................... 198/346.1; 29/33 P
[58] Field of Search ................. 198/345, 346.1, 465.1, 198/742; 29/33 P, 563; 414/222

[56] References Cited

U.S. PATENT DOCUMENTS

| | | | |
|---|---|---|---|
| 3,301,374 | 1/1967 | Proctor | 198/742 |
| 3,690,433 | 9/1972 | Buldini | 198/345 |
| 4,014,428 | 3/1977 | Ossbahr | 198/345 |
| 4,438,839 | 3/1984 | Tomson | 198/345 |
| 4,444,303 | 4/1984 | Burgess | 198/345 |
| 4,492,301 | 1/1985 | Inaba et al. | 198/345 |
| 4,533,034 | 8/1985 | Gregg | 198/472 |
| 4,598,816 | 7/1986 | Kutzli et al. | 198/346.1 |
| 4,611,704 | 9/1986 | Burgess | 198/465.1 |

FOREIGN PATENT DOCUMENTS

| | | |
|---|---|---|
| 2845913 | 4/1980 | Fed. Rep. of Germany . |
| 2940517 | 4/1980 | Fed. Rep. of Germany . |
| 3133588 | 3/1983 | Fed. Rep. of Germany . |
| 3416858 | 11/1985 | Fed. Rep. of Germany . |
| 2039236 | 8/1989 | United Kingdom . |

OTHER PUBLICATIONS

*Flexible Automation,* (4/85), pp. 22 & 24.
*VDI,* Dec. 1958, (7 pages).

*Primary Examiner*—Joseph E. Valenza
*Attorney, Agent, or Firm*—Bernard, Rothwell & Brown

[57] ABSTRACT

A transfer machine has at least one station at which a stationary clamping device is provided to which workpieces can be transported on pallets by a feed device, wherein the pallets are constructed as clamping shoes, and the clamping device includes a lifting arrangement and a clamping holder against which the workpieces can be clamped via the pallets through the lifting arrangement.

20 Claims, 2 Drawing Sheets

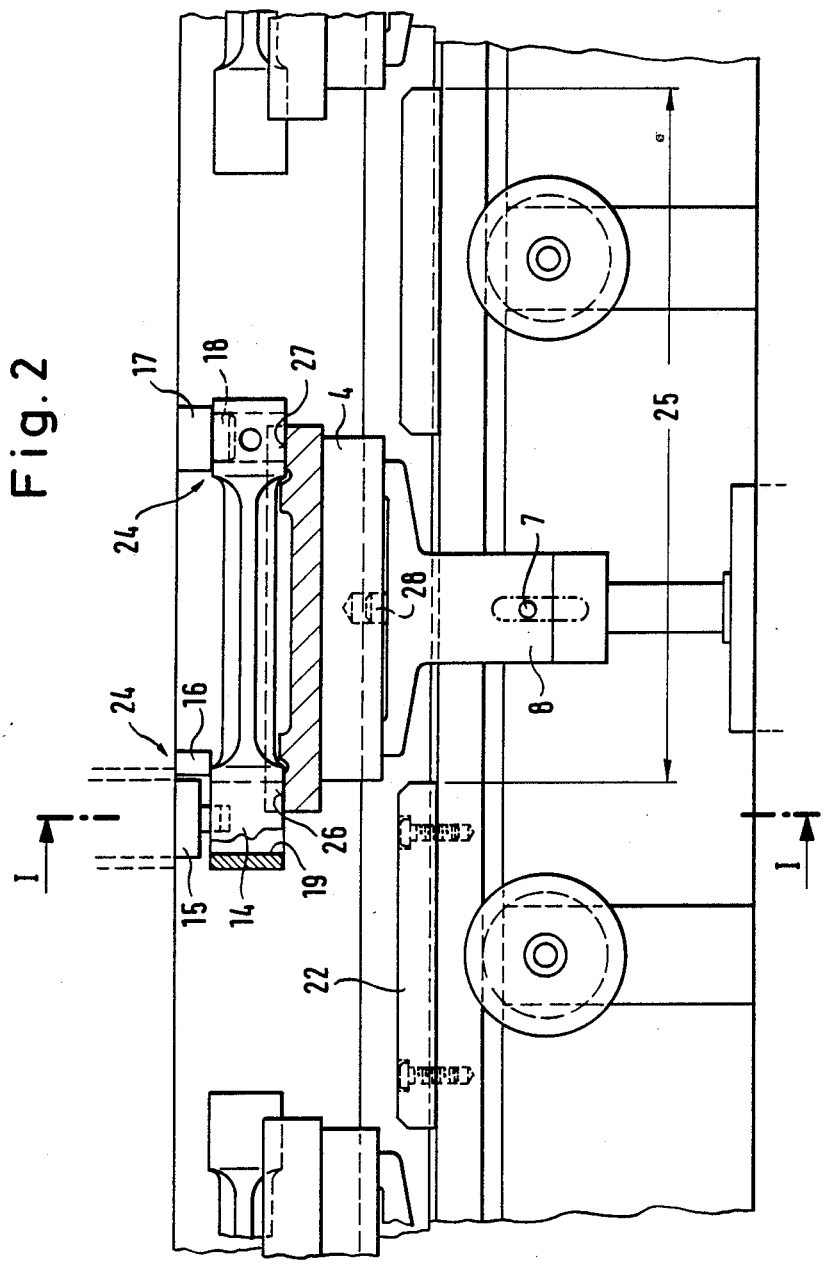

CLAMPING DEVICE FOR PALLETS

This is a continuation of application Ser. No. 065,851, filed June 24, 1987 now abandoned.

The invention relates to a device for workpiece carrier pallets of a transfer machine in which in at least one station a stationary clamping device is provided to which workpieces on pallets can be brought by means of a feed or transport device.

Devices of the said type are known in various implementations, their overwhelmingly common feature being the use of pallets for transporting the workpieces. The advantages of pallets are regarded as sufficiently known so that they will not be described in further detail. Examples of this type of workpiece transport are to be found in the documents DE-OS No. 3416858, DE-PS No. 2940517, DE-OS No. 3133588 and others. A further overview of this specialist field is to be found in the magazine "Flexible Automation" 4/1985, pages 22 to 24, "Workpiece pallets for automatic Production". It is a common feature of all these documents that the use of the pallet is only as a transport means for workpieces. Thus, for processing the workpieces it is necessary, using suitable means, to remove them from the pallet, to fix them and to clamp them.

It thus requires special gripping devices adapted to the shape of the workpiece in order to remove the workpieces from the pallet, whilst in each process fixing and clamping devices are necessary if a construction dependent on the workpiece. Furthermore, pallets are used in a manner such that workpieces thereon are fixed and clamped with suitable means such as may be seen from the document DE-OS No. 3416858. At the processing stations, the pallets must then be fixed and clamped. Where accuracy is required, additions of fixing errors can occur in this connection which negate the practicability of this principle. Moreover, the technical outlay required to clamp the workpiece on the pallet with the necessary means and then to clamp the pallet with the workpiece at the processing station with the likewise necessary means is very large. In addition to those mentioned, still further types of pallets may be employed, according to the particular purpose of use, which however are not further described in detail since they are not relevant to the requirement within the scope of the application for increased processing precision with saving of costs. To some extent this requirement is satisfied in the state of the art in that workpieces are freed from the loose holding effect of the pallet by means providing a mounting which is as free of play as possible, as already mentioned. This mounting is then advantageously constructed in such manner that it is connected to the machine tool bed via fixed base elements free of play.

For reasons of cost, the object is now to provide possibilities of economy, especially in large processing installations. For this purpose, the possibility of omitting the working step of removing the workpieces from the pallets suggests itself so that a solution of the problem is achieved in that the pallets are constructed as clamping shoes, and in that a lifting arrangement is provided in the clamping device, and in that likewise a fixed or exchangeable clamping installation is provided against which the workpieces with and on the pallets can be clamped by means of the lifting arrangement.

The following is a description of the device according to the invention:

In the drawings:

FIG. 2 shows a lateral view of FIG. 1 in the direction II.

Figure 1:
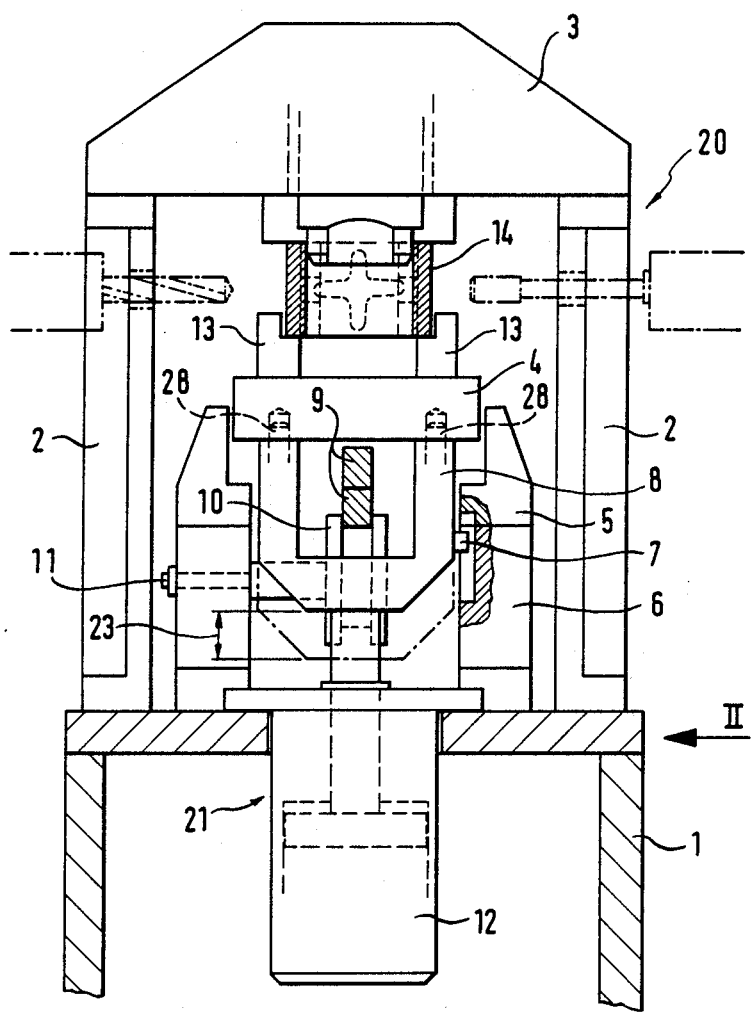
FIG. 1 shows a view in the direction I—I of FIG. 2.

On a machine bed 1, a crossbar 3 is secured on supports 2 and carries workpiece holders 16 and 17, a fixed securing pin 18, generally exchangeable, being provided in the holder 17 for receiving piston rods, for example. The second fixing is achieved, where piston rods are processed, by a securing pin 15 in the second piston rod bore 19. If the second piston rod bore 19 is to be processed, the fixing 15 must be withdrawable in order to enable introduction of a processing tool. In the illustrated case, fixing 15 can be immovable in that the provision of a transverse bore is not thereby prevented. For receiving the workpieces 14, the pallet 4 is provided with carriers 13 which are adequate to secure the workpieces 14 during transport. In the following, it should also be understood that the carriers 13 allow the workpieces 14 sufficient play in order to permit location into the positioning arrangement 24 with the clamping lift forks 8. In this connection, the pallets 4 will be raised to an extent such that they are removed from the feed device 9 which perform a return stroke without the pallets.

The pallets 4 are now constructed to be sufficiently strong that they can function as clamping shoes in order to absorb the clamping forces without detrimental bending. The pallets 4 slide during transport on a slide track 5 which is secured on supports 6 at a certain spacing from the machine bed 1. The feed device 9, which is provided with positioning elements 22, is activated by elements such as hydraulic cylinders or drives which are not illustrated, whose construction and effect are known to the expert, in order to push the pallets 4 further along the slide track 5.

For support purposes, the feed device 9 is mounted on rollers 10 or similar slide arrangements which are held in the supports 6 by the mounting bolts 11. For transmission of the clamping stroke 23, forks 8 are provided which are constructed in such manner that tilting of the raised pallet 4 with the workpiece 14 located thereon cannot take place. Two pins 28 serve for fixing in the pallet 4. The drawings do not show arrangements which hinder failure of the pins 28 to locate during automatic operation and prevent breakdowns. The same applies to the lifting of the device 21 in a manner such that sticking of the pallet 4 to the workpiece 14 by jamming on the clamping holders 16,17 and in the fixing arrangement 24 is prevented with suitable means known to the expert.

I claim:

1. An apparatus for positioning and clamping workpieces in a processing station, comprising:
   (a) a processing station having a clamping device including alignment means for complimentarily engaging and aligning a workpiece to be processed in the processing station;
   (b) a workpiece pallet for transporting a workpiece to said processing station, said workpiece pallet including a workpiece carrier for carrying the workpiece during transport to said processing station with the workpiece displaceably placed on the workpiece carrier so as to provide sufficient play to the workpiece being carried to enable the workpiece to engage and be aligned by said alignment means at the processing station;

(c) feed device means for conveying the pallet, workpiece carrier and workpiece to said processing station; and (d) means at said processing station for lifting the pallet with the workpiece thereon so as to press the workpiece against and align the workpiece with the alignment means and thereby clamp the workpiece between the pallet workpiece carrier and the alignment means, for processing the workpiece in the processing station.

2. Apparatus according to claim 1 wherein the pallets are exchangeably held and aligned on the feed device with respect to the clamping device by positioning elements.

3. Apparatus according to claim 2 wherein the positioning elements comprise screwed engaging members and the pallets are held by their own weight on the feed device.

4. Apparatus according to claim 1 wherein the lifting device lifts the pallets from the feed device via forks, clamps the pallets and after processing replaces the pallets on the feed device.

5. Apparatus according to claim 1 wherein the clamping device includes fixed securing pins to align the workpiece on the clamping holder.

6. Apparatus according to claim 1 wherein the clamping device is fixed.

7. Apparatus according to claim 2 wherein the positioning elements comprise screwed engaging members and the pallets are held by their own weight on the feed device, the feed device comprising in this region at least two circular rods.

8. Apparatus according to claim 2 wherein the positioning elements are comprised of screwed engaging members and the pallets are held by their own weight on the feed device, the feed device comprising in this region at least two non-circular rods.

9. Apparatus according to claim 2 wherein the positioning elements preferably consist of screwed engaging members and the pallets are held by their own weight on the feed device, the feed device being held in rollers for providing feed displacement.

10. Apparatus according to claim 2 wherein the positioning elements comprise screwed engaging members and the pallets are held by their own weight on the feed device, the feed device being held in sliding guides for providing the feed displacement.

11. Apparatus according to claim 1 wherein the clamping device is exchangeable.

12. A process for positioning and clamping workpieces in a processing station, comprising:

(a) providing a processing station including alignment means for complimentarily engaging and aligning a workpiece to be processed in the processing station;

(b) providing a workpiece pallet for transporting a workpiece to said processing station, said workpiece pallet including a workpiece carrier for carrying the workpiece during transport to said processing station;

(c) displaceably placing a workpiece on the workpiece carrier so that the workpiece carrier provides sufficient play to the workpiece being carried to enable the workpiece to engage and be aligned by said alignment means at the processing station;

(d) conveying the pallet, workpiece carrier and workpiece to said processing station; and (e) lifting the pallet with the workpiece thereon at said processing station so as to press the workpiece against and align the workpiece with the alignment means and thereby clamp the workpiece between the pallet workpiece carrier and the alignment means, for processing the workpiece in the processing station.

13. Apparatus according to claim 1, wherein the alignment means comprises a disengageable portion which may be withdrawn while the workpiece remains clamped.

14. An apparatus for positioning and clamping a workpiece for processing at a processing station comprising:

(a) a pallet for transporting the workpiece to the processing station and for carrying the workpiece with sufficient play to permit positioning and clamping at the processing station;

(b) a workpiece holder at the processing station for engaging the workpiece, (c) means for pressing the pallet with the workpiece against the workpieces holder so that the workpiece holder engages and positions the workpiece and so that the workpiece is clamped in the desired position for processing between the pallet and the workpiece holder.

15. Apparatus of claim 14, wherein the pallet comprises a workpiece carrier for holding the workpiece to the pallet in an approximate position with sufficient free play to allow clamping between the workpiece carrier and the workpiece holder under the force of the pressing means.

16. Apparatus of claim 15, wherein the workpiece holder comprises a fixed securing pin for engaging a recess in the workpiece to position the workpiece for processing and for clamping the workpiece in place under the force of the pressing means.

17. Apparatus of claim 15, wherein the workpiece holder comprises a securing pin for aligning the workpiece on the pallet before the workpiece is clamped against the workpiece holder, the securing pin being withdrawable while the workpiece remains clamped against the workpiece holder.

18. Method for positioning and clamping a workpiece for processing at a pressing station comprising the steps of (a) transferring the workpiece to the processing station on a pallet which holds the workpiece with sufficient play to permit positioning;

(b) pressing the pallet and thereby the workpiece towards a workpiece holder at the processing station so that the workpiece is brought by the workpiece holder to the desired final position, (c) pressing the pallet further against the workpiece holder so that the workpiece is clamped between the pallet and the workpiece holder.

19. Method according to claim 18, wherein the step of pressing the pallet so that the workpiece is positioned comprises pressing the pallet against a securing pin which engages recesses in the workpiece to position the workpiece.

20. Method according to claim 19 further comprising, after the step of pressing the pallet so that the workpiece is clamped, withdrawing the securing pin before processing the workpiece.

* * * * *